United States Patent
Okada et al.

(10) Patent No.: US 10,824,389 B2
(45) Date of Patent: Nov. 3, 2020

(54) ACOUSTIC SYSTEM

(71) Applicant: TOYOTA JIDOSHA KABUSHIKI KAISHA, Toyota-shi, Aichi-ken (JP)

(72) Inventors: Hiroki Okada, Toyota (JP); Ryuta Atsumi, Toyota (JP); Daisuke Hiroki, Okazaki (JP); Shinpei Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/411,988

(22) Filed: May 14, 2019

(65) Prior Publication Data

US 2020/0012474 A1    Jan. 9, 2020

(30) Foreign Application Priority Data

Jul. 6, 2018    (JP) .................................. 2018-128885

(51) Int. Cl.
*G06F 3/16*    (2006.01)
*H04R 1/10*    (2006.01)
(Continued)

(52) U.S. Cl.
CPC ........... *G06F 3/165* (2013.01); *H04R 1/1041* (2013.01); *H04R 3/12* (2013.01); *B60R 25/25* (2013.01);
(Continued)

(58) Field of Classification Search
CPC ..... G06K 9/00885; G06F 3/165; G06F 21/30; H04R 1/1041; H04R 3/12; H04R 2420/03;
(Continued)

(56) References Cited

U.S. PATENT DOCUMENTS

2001/0048749 A1* 12/2001 Ohmura .................. H04L 67/02
381/86
2002/0032048 A1* 3/2002 Kitao .................. H04M 1/6091
455/569.2

(Continued)

FOREIGN PATENT DOCUMENTS

JP    2008022389 A  *  1/2008
JP    2010-086328 A    4/2010
(Continued)

*Primary Examiner* — Davetta W Goins
*Assistant Examiner* — Kuassi A Ganmavo
(74) *Attorney, Agent, or Firm* — Oliff PLC

(57) ABSTRACT

An acoustic system includes: a first terminal device including a first-terminal sound emitting unit, an earhole sound collecting unit configured to collect earhole echo sound, and a first-terminal control unit configured to perform authentication between the first terminal device and a user based on the echo sound collected by the earhole sound collecting unit; an onboard device including an onboard-device sound emitting unit and an onboard-device control unit configured to perform authentication between the onboard device and the user based on communication with the first terminal device; and a second terminal device includes a second-terminal control unit configured to set a destination of sound data to one of the first terminal device and the onboard device when the onboard-device control unit detects that a predetermined condition including a condition that the user has been authenticated is satisfied.

14 Claims, 5 Drawing Sheets

(51) Int. Cl.
*H04R 3/12* (2006.01)
*H04M 1/725* (2006.01)
*H04W 4/40* (2018.01)
*G06K 9/00* (2006.01)
*B60R 25/25* (2013.01)

(52) U.S. Cl.
CPC ... *B60W 2540/221* (2020.02); *G06K 9/00885* (2013.01); *H04M 1/72577* (2013.01); *H04R 2420/03* (2013.01); *H04W 4/40* (2018.02)

(58) Field of Classification Search
CPC ........ H04M 1/72577; B60W 2540/221; B60R 25/25; H04W 4/40; H04W 12/66
See application file for complete search history.

(56) References Cited

U.S. PATENT DOCUMENTS

| | | | | |
|---|---|---|---|---|
| 2006/0052140 | A1* | 3/2006 | Hicks, III | H04M 1/6075 455/569.1 |
| 2009/0087003 | A1* | 4/2009 | Zurek | G06K 9/00885 381/312 |
| 2012/0329520 | A1* | 12/2012 | Akama | G01C 21/3688 455/557 |
| 2013/0171965 | A1* | 7/2013 | Schrecker | H04B 5/0006 455/411 |
| 2014/0273859 | A1* | 9/2014 | Luna | H04W 4/023 455/41.3 |
| 2015/0019266 | A1* | 1/2015 | Stempora | G06Q 40/08 705/4 |
| 2015/0359015 | A1* | 12/2015 | Hrabak | H04W 76/10 709/227 |
| 2015/0363986 | A1* | 12/2015 | Hoyos | H05K 999/99 340/5.61 |
| 2015/0365771 | A1* | 12/2015 | Tehrani | H04R 25/554 381/315 |
| 2016/0077789 | A1* | 3/2016 | Hampiholi | G06F 3/165 709/203 |
| 2019/0189129 | A1* | 6/2019 | Arakawa | H04R 1/10 |

FOREIGN PATENT DOCUMENTS

| | | | |
|---|---|---|---|
| JP | 2011160104 A | * | 8/2011 |
| JP | 2015-032155 A | | 2/2015 |

* cited by examiner

ACOUSTIC SYSTEM

INCORPORATION BY REFERENCE

The disclosure of Japanese Patent Application No. 2018-128885 filed on Jul. 6, 2018 including the specification, drawings and abstract is incorporated herein by reference in its entirety.

BACKGROUND

1. Technical Field

The disclosure relates to an acoustic system.

2. Description of Related Art

There is a terminal device that is worn on an ear of a user and has an earhole authentication function of emitting reference sound from a sound emitting unit to an earhole, collecting echo sound using a sound collecting unit, and authenticating the user based on features of the echo sound specific to the user (see Japanese Unexamined Patent Application Publication No. 2010-86328 (JP 2010-86328 A)).

Regarding acoustic technology for improving convenience for a user in a vehicle, there is a vehicular audio notification system that enables a user in a vehicle to easily understand a situation outside the vehicle by emitting corresponding sound from a speaker inside the vehicle when a microphone collecting sound outside the vehicle has collected sound emitted from a specific device such as a siren outside the vehicle (see Japanese Unexamined Patent Application Publication No. 2015-32155 (JP 2015-32155 A)).

SUMMARY

It is conceivable that whether to permit a user wearing a terminal device to perform an operation such as unlocking a door of a vehicle be controlled using a user authentication function using the terminal device disclosed in JP 2010-86328 A. However, for example, when a user is in a vehicle while listening to music using a terminal device and wants to switch the music to an output from a speaker of the vehicle, the user has to perform a switching operation.

The disclosure provides an acoustic system that improves convenience for a user when a user who is wearing an acoustic device having an authentication function boards a vehicle.

An aspect of the present disclosure is an acoustic system including: a first terminal device configured to be worn on a user's earhole; an onboard device; and a second terminal device configured to transmit sound data to a predetermined destination out of the first terminal device and the onboard device. The first terminal device includes a first-terminal sound emitting unit configured to emit authentication sound with a predetermined frequency and a predetermined sound pressure and sound based on the sound data received by the first terminal device to the user's earhole, an earhole sound collecting unit configured to collect echo sound from the user's earhole in response to the authentication sound, and a first-terminal control unit configured to perform authentication between the first terminal device and a user based on the echo sound. The onboard device includes an onboard-device sound emitting unit configured to emit sound based on sound data which is received or generated by the onboard device, and an onboard-device control unit configured to perform authentication between the onboard device and the user based on communication with the first terminal device. The second terminal device includes a second-terminal control unit configured to select the first terminal device as the destination of the sound data when the onboard-device control unit does not detect that a predetermined condition including a condition that the user has been authenticated has been satisfied and to select one of the first terminal device and the onboard device as the destination of the sound data when the onboard-device control unit detects that the predetermined condition has been satisfied.

According to this aspect, when a user who is wearing the first terminal device which is a device having an authentication function using earhole echo sound on the user's ear board a vehicle, from which of the first terminal device and the onboard device sound which is desired by the user is to be emitted can be determined based on a predetermined setting without causing the user to perform such determination and thus it is possible to provide an acoustic system that can improve convenience for a user.

In the aspect, the predetermined condition may further include a condition that the first terminal device Is in a vehicle.

The destination of the sound data may be determined in advance in correlation with at least the user.

The destination of the sound data may be determined in advance in correlation with at least a type indicating a classification of the sound data.

The predetermined condition which is used for the second-terminal control unit to select a destination of a predetermined type of sound data out of the sound data may further include a condition that there is no occupant other than the user in a vehicle.

The onboard-device sound emitting unit may include a plurality of speakers. The onboard-device control unit may be configured to detect a position of the user in a vehicle. The onboard-device control unit may be configured to reduce a sound volume which is able to be emitted from at least a speaker closest to the user or to silence the speaker when it is detected that the second terminal device is transmitting a predetermined type of sound data to the first terminal device.

The second-terminal control unit may be configured to select the destination of the sound data based on information acquired from a server.

The onboard-device control unit may be configured to generate sound data. The onboard-device control unit may be configured to select the first terminal device as a destination of the sound data generated by the onboard-device control unit when the user has been authenticated.

The onboard-device control unit may be configured to select one of the first terminal device and the onboard-device sound emitting unit as the destination of the sound data generated by the onboard-device control unit when it is detected that the first terminal device is in a vehicle after the user has been authenticated.

The onboard-device control unit may be configured to select the destination of the sound data generated by the onboard-device control unit based on information acquired from a server.

The first terminal device may further include a voice collecting unit configured to collect a user's voice. The first-terminal control unit may be configured to generate sound data based on the voice collected by the voice collecting unit. The first-terminal control unit may be configured to select the second terminal device as the destination of the sound data generated by the first-terminal control unit when the onboard-device control unit does not detect that the user has been authenticated, and to select the onboard device as the destination of the sound data generated by the first-terminal control unit when the onboard-device control unit detects that the user has been authenticated.

The first-terminal control unit may be configured to emit sound of an inaudible band as the authentication sound at the same time as emitting sound based on the sound data received by the first terminal device when the first-terminal sound emitting unit is made to emir the authentication sound while the first-terminal sound emitting unit is emitting the sound based on the sound data.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS (Outline)

An acoustic system according to an aspect of the disclosure includes a first terminal device that is worn on a user's ear, a second terminal device such as a smartphone, and a vehicle. When the user is distant from the vehicle, the second terminal device transmits sound data such as music to the first terminal device. Accordingly, the user can listen to music using the first terminal device. When the user boards the vehicle, the second terminal device sets a destination of sound data to a predetermined one of the first terminal device and a speaker of the vehicle. Accordingly, even when the user does not perform an operation of setting an output, the user can listen to, for example, music depending on the user's taste using the first terminal device or the speaker of the user vehicle and thus convenience for the user is high.

Embodiment

An embodiment of the disclosure will be described below in detail with reference to the accompanying drawings.
<Configuration>

Figure 1:
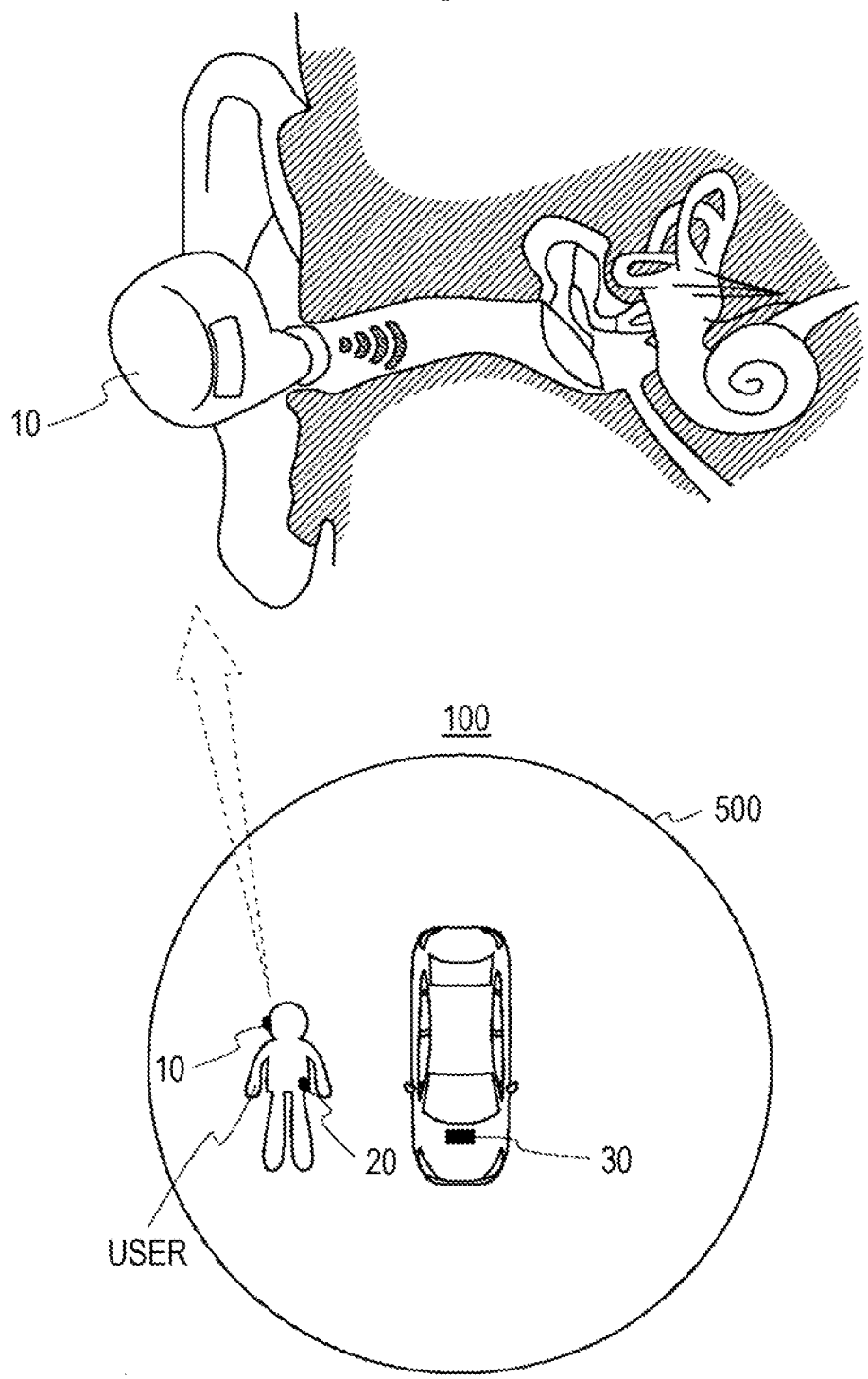
FIG. 1 is a diagram illustrating an example of a configuration of an acoustic system according to an embodiment of the disclosure.

FIG. 1 illustrates an example of a configuration of an acoustic system 100 according to this embodiment. The acoustic system 100 includes a first terminal device 10 that is worn, for example, on a user's ear, a second terminal device 20 that is carried by the user, and an onboard device 30 that is mounted in a vehicle. The first terminal device 10 can wirelessly communicate with the onboard device 30 when the first terminal device 10 is within a predetermined range 500 in which a distance from the onboard device 30 is less than a predetermined distance. The second terminal device 20 is a portable terminal device such as a smartphone and can wirelessly communicate with the first terminal device 10 when a distance from the first terminal device 10 is less than a predetermined distance.

Figure 2:
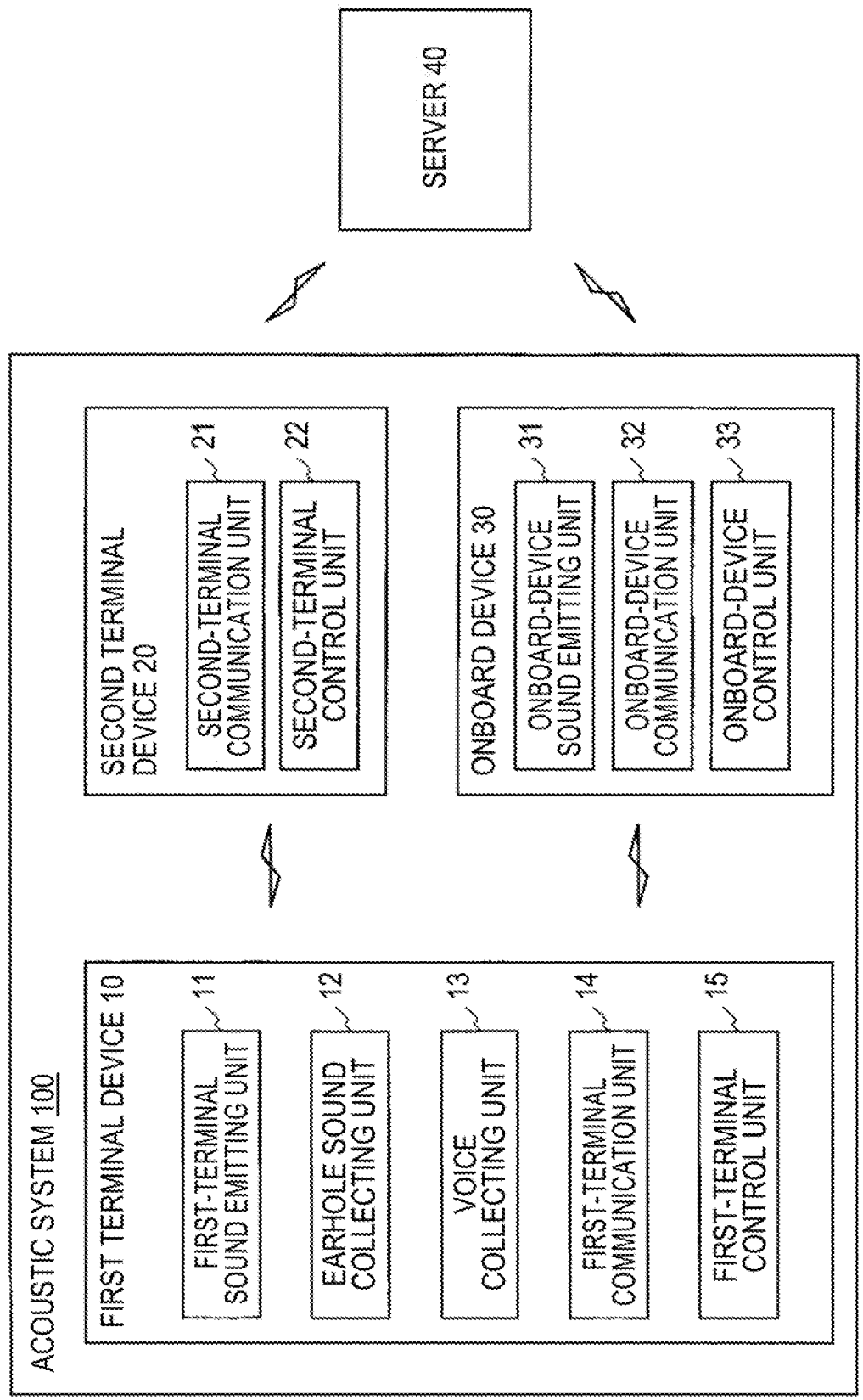
FIG. 2 is a diagram illustrating functional blocks of the acoustic system according to the embodiment of the disclosure.

FIG. 2 illustrates an example of functional blocks of the acoustic system 100. The first terminal device 10 includes a first-terminal sound emitting unit 11 that emits sound to a user's earhole, an earhole sound collecting unit 12 that collects sound in the user's earhole, a voice collecting unit 13 that collects a user's voice, and a first-terminal communication unit 14 that communicates with the second terminal device 20 and the onboard device 30 and may farther include various buttons or an acceleration sensor. The first terminal device 10 includes a first-terminal control unit 15 that controls operations of the constituent units.

The second terminal device 20 includes a second-terminal communication unit 21 that performs communication with the first terminal device 10, the onboard device 30, and a server 40 which will be described later and may further include an input unit that receives an input from a user and a display unit that displays a notification to a user. The second terminal device 20 includes a second-terminal control unit 22 that controls operations of these constituent units.

The onboard device 30 includes an onboard-device sound emitting unit 31 including a speaker which is provided in a vehicle, an onboard-device communication unit 32 that performs communication with the first terminal device 10, the second terminal device 20, and a server 40 which will be described later, and an onboard-device control unit 33 that controls operations of these constituent units.

The first-terminal control unit 15, the second-terminal control unit 22, and the onboard-device control unit 33 each include a processor mat performs a control process and a storage unit that appropriately stores information which is used for the control process. The second-terminal communication unit 21 and the onboard-device communication unit 32 may perform radio communication with an external server 40 via a network such as the Internet.

<Process Flow>

Figure 3:
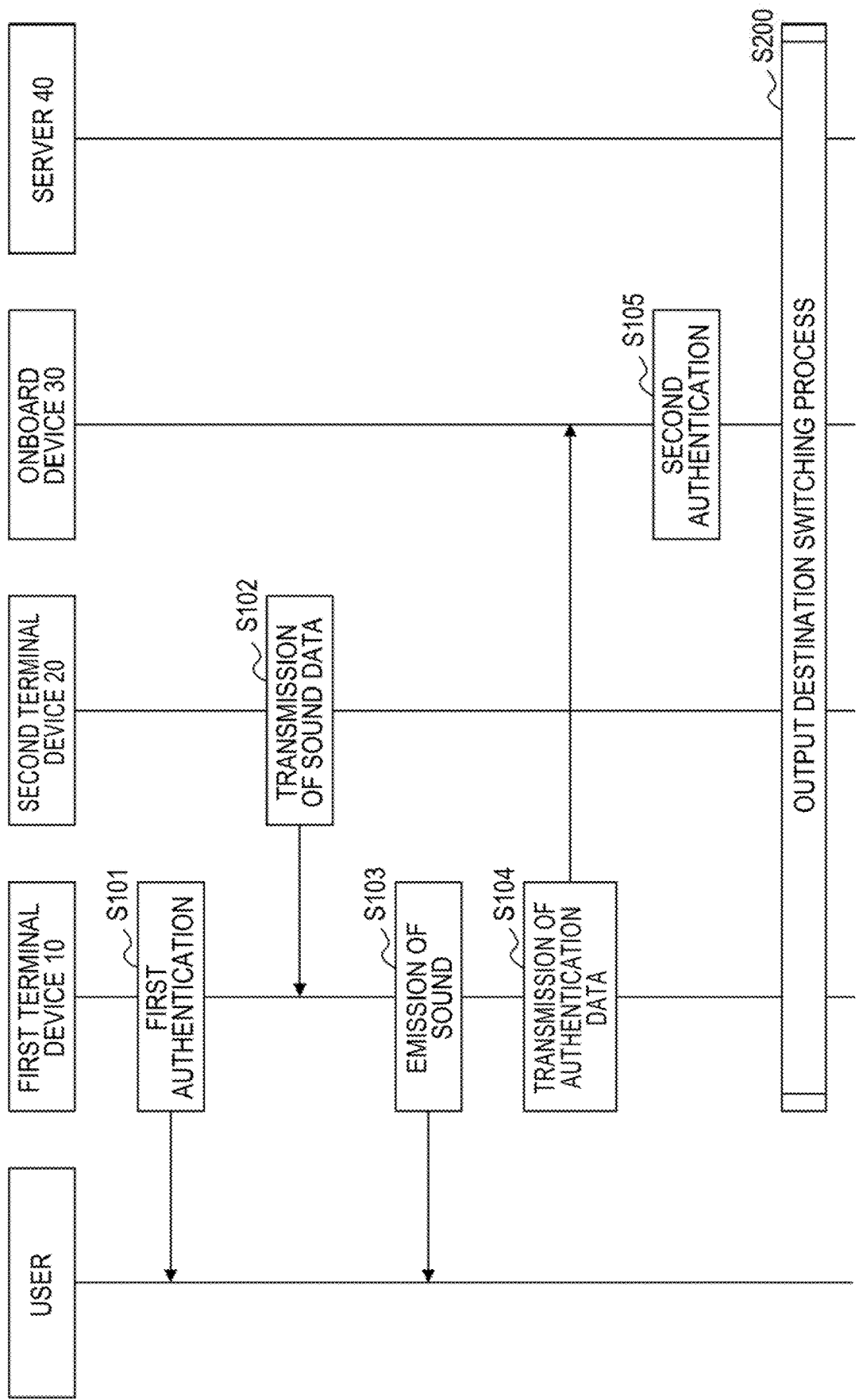
FIG. 3 is a sequence diagram illustrating a process flow according to the embodiment of the disclosure.

FIG. 3 is a sequence diagram illustrating a process flow which is performed by the first terminal device 10, the second terminal device 20, and the onboard device 30. Process details thereof will be described below with reference to FIG. 3. This process flow is started, for example, when a user is wearing the first terminal device 10 on the user's ear.

(Step S101): The first-terminal control unit 15 performs first authentication. The first authentication is performed using the following method. The first-terminal control unit 15 causes the first-terminal sound emitting unit 11 to emit authentication sound with a predetermined frequency and a predetermined sound pressure into the user's earhole. The first-terminal control unit 15 causes the earhole sound collecting unit 12 to collect echo sound of the authentication sound from the user's earhole. Sound pressure characteristics for each frequency of echo sound have a pattern unique to an earhole. The first-terminal control unit 15 calculates a degree of coincidence between characteristics of the collected echo sound and characteristics of echo sound of an authorized user's earhole which is registered and stored in advance in the first terminal device 10, and authenticates the user as an authorized user of the first terminal device 10 when the degree of coincidence is greater than a predetermined value. The first authentication is authentication between the first terminal device 10 and a user.

(Step S102): The second-terminal control unit 22 sets a destination of sound data to the first terminal device 10 in this step. The second-terminal control unit 22 causes the second-terminal communication unit 21 to transmit sound data to the first terminal device 10. Sound data includes, for example, music data which is stored in the second terminal device 20 or communication voice data when the second terminal device 20 is a mobile phone. The first terminal device 10 and the second terminal device 20 perform, for example, a process (pairing) of recognizing each other as communication partners in advance, and actually start communication of sound data in response to a notification indicating that authentication of the user in Step S101 has succeeded in this example. The second-terminal control unit 22 can detect that the first authentication has succeeded, for example, by receiving a notification from the first terminal device 10.

(Step S103): The first-terminal control unit 15 causes the first-terminal sound emitting unit 11 to emit sound based on sound data received by the first-terminal communication unit 14. In case of a telephone, in parallel with the processes of Steps S102 and S103, the first-terminal control unit 15 causes the voice collecting unit 13 to collect voice of the user, generates sound data based on the voice, and causes the first-terminal communication unit 14 to transmit the generated sound data to the second terminal device 20. The processes of Steps S102 and S103 are equivalent to processes such as reproduction of music or voice communication by radio communication between a smartphone and a head set such as an earphone which is performed in general. The processes such as reproduction of music or voice communication are performed when the user performs a predetermined starting operation and are continuously performed until a stopping operation is performed, but are not performed when the starting operation has not been performed.

(Step S104): When a user who is wearing the first terminal device 10 approaches the vehicle for boarding the vehicle and enters the above-mentioned range 500, the first terminal device 10 and the onboard device 30 can communicate with each other. The first-terminal control unit 15 detects that communication is possible when the first-terminal communication unit 14 receives radiowaves from the onboard device 30. The onboard-device control unit 33 detects that communication is possible when the onboard-device communication unit 32 receives radiowaves from the first terminal device 10. The first-terminal control unit 15 transmits authentication data which is used for second authentication which will be described later.

(Step S105): The onboard-device control unit 33 performs second authentication. The second authentication is performed using the following method. The onboard-device control unit 33 communicates with the first terminal device 10 and detects that the first terminal device 10 is in a paired state. When the first terminal device 10 is in a paired state and the authentication data received from the first terminal device 10 indicates that the first authentication has succeeded, the onboard-device control unit 33 authenticates the user as an authorized user of the vehicle. Alternatively, the on board-device control unit 33 may receive information indicating echo sound of the user collected by the earhole sound collecting unit 12 instead of the result of first authentication from the first terminal device 10 as the authentication data. In this case, the onboard-device control unit 33 calculates a degree of coincidence between characteristics of echo sound indicated by the authentication data and characteristics of echo sound from the earhole of the authorized user of the vehicle which is registered in advance in the onboard device 30 or the server 40 and authenticates the user as an authorized user of the vehicle when the first terminal device 10 is in a paired state and the degree of coincidence is greater than a predetermined value. The second authentication is authentication between the onboard device 30 and the user via the first terminal device 10, and various devices mounted in the vehicle permit a door unlocking operation or an engine starting operation of the vehicle when the second authentication has succeeded.

(Step S200): After user authentication by the second authentication has succeeded, a process of switching an output destination of sound data is performed. An example of details of the output destination switching process of Step S200 will be described below.

Figure 4:
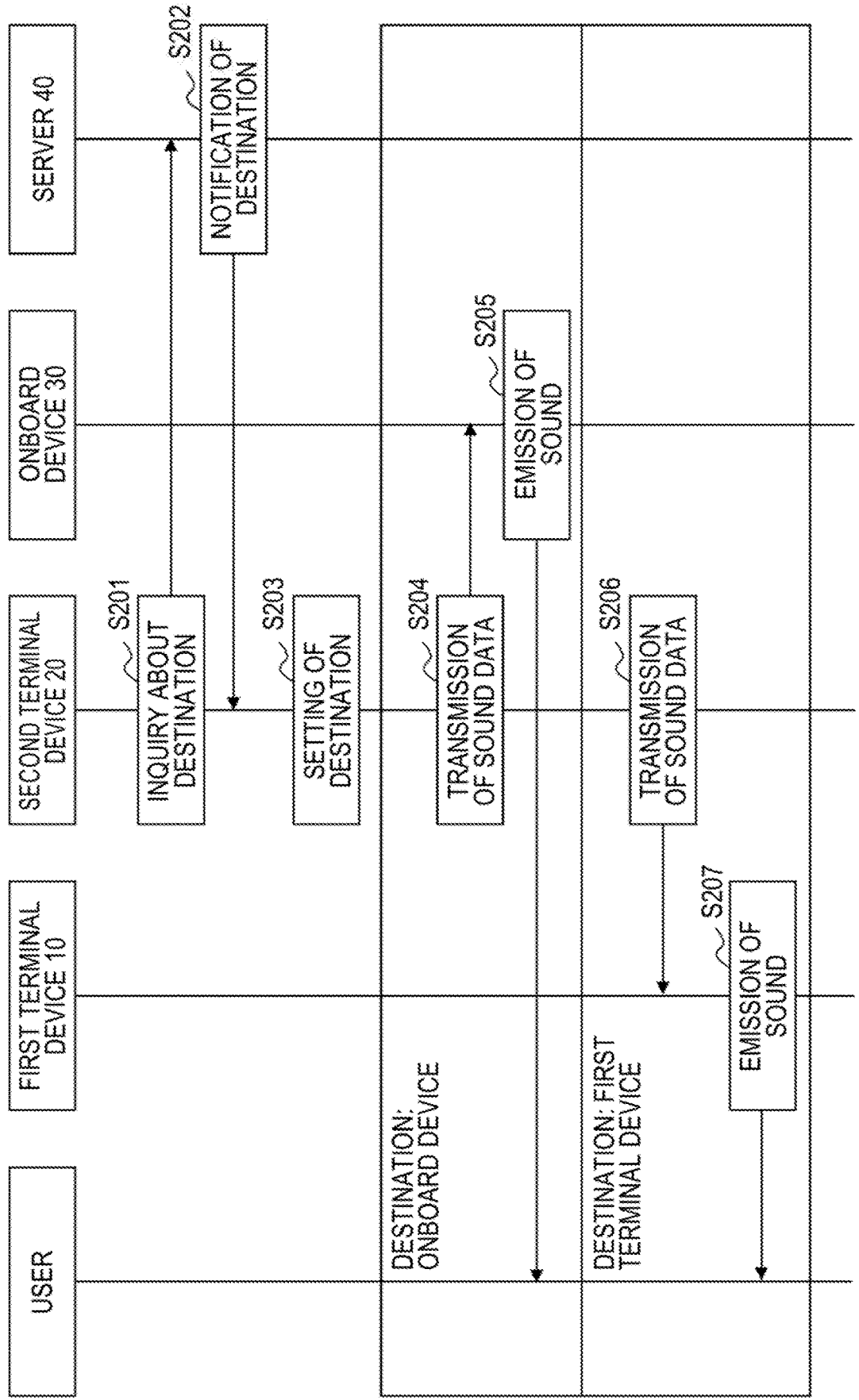
FIG. 4 is a sequence diagram illustrating a detailed process flow according to the embodiment of the disclosure.

(Example of details of Step S200: Steps S201 to S207): FIG. 4 is a sequence diagram illustrating an example of a detailed flow of the output destination switching process. In this example, the second terminal device 20 switches a destination of sound data.

(Step S201): The second-terminal control unit 22 can detect that the second authentication has succeeded, for example, when the second-terminal communication unit 21 receives a notification from the onboard device 30. This notification may be received via the first terminal device 10. When the second authentication has succeeded, the second-terminal control unit 22 inquires of the server 40 about a destination of sound data by communication of the second-terminal communication unit 21. The destination of sound data is determined in advance for each identifier of a user or for each type indicating a classification of sound data, and the server 40 stores, for example, a table shown in Table 1. The destination of sound data may be determined regardless of an identifier of a user. The destination of sound data may be determined regardless of the classification of sound data. The second-terminal control unit 22 specifies information required for referring to the destination of sound data such as an identifier of a user or the type based on a method of prescribing the destination of sound data and inquires of the server 40 about the information

TABLE 1

| User | Type: music | Type: telephone |
|---|---|---|
| A | Onboard device | First terminal device |
| B | First terminal device | First terminal device |
| C | Onboard device | Onboard device |

(Step S202): The server 40 notifies the second terminal device 20 of the corresponding destination in response to the inquiry. The table shown in Table 1 can be set in advance by each user depending on the user's taste. A type other than music and telephone may be prepared as the type of sound data or the type may not be prepared.

(Step S203): The second-terminal control unit 22 sets the destination transmitted from the server 40 as the destination of sound data. For example, when the identifier of a user is "A" and the type of sound data which is currently being transmitted is "music," the destination thereof is switched from the first terminal device 10 to the onboard device 50. When the identifier of a user is "A" and the type of sound data which is currently being transmitted is "telephone," the destination thereof is set to the first terminal device 10 and the destination is not switched as a result.

(Step S204): When the destination set in Step S203 is the onboard device 30, Steps S204 and S205 are performed. The second-terminal control unit 22 causes the second-terminal communication unit 21 to stop transmission of sound data to the first terminal device 10 which is started in Step S102 and to transmit sound data to the onboard device 30. The second terminal device 20 and the onboard device 30 perform, for example, a process (pairing) of recognizing each other as communication partners in advance. In general, the onboard-device sound emitting unit 31 is not supplied with power at the time of ignition off or the like and cannot emit sound. Accordingly, it is preferable that the second-terminal control unit 22 ascertain whether emission of sound from the onboard-device sound emitting unit 31 is possible by communication with the onboard device 30 before performing ibis step, and suspend performing of this step until the emission of sound is possible.

(Step S205): The onboard-device control unit 33 causes onboard-device sound emitting unit 31 to emit sound based on sound data received by the onboard-device communication unit 32. In this way, the process flow ends.

(Step S206): When the destination set in Step S203 is the first terminal device 10. Steps S206 and S207 are performed. The second-terminal control unit 22 causes the second-terminal communication unit 21 to continuously perform transmission of sound data to the first terminal device 10 which is started in Step S102.

(Step S207): The first-terminal control unit 15 causes the first-terminal sound emitting unit 11 to emit sound based on sound data received by the first-terminal communication unit 14. In this way, the process flow ends.

In the above-mentioned example, switching of a destination of sound data can be performed by the second terminal device 20. Accordingly, when a user boards the vehicle, it is possible to switch the destination to which of the first terminal device 10 and the onboard device 30 sound is to be emitted from, for example, depending on the type of sound data and the user's taste without causing the user to perform the switching operation, which provides high convenience. The switching may be performed when a predetermined condition that the second terminal device 20 has detected success of the second authentication indicating that a user who is wearing the first terminal device 10 approaches the vehicle has been satisfied or may be performed when a predetermined condition that the second terminal device 20 has detected that a user who is wearing the first terminal device 10 actually boards the vehicle has been satisfied. For example, when the onboard-device control unit 33 causes the onboard-device sound emitting unit 31 to emit audible sound with a predetermined pattern into the vehicle or inaudible sound such as ultrasonic waves or extremely low frequency waves, the first terminal device 10 further includes a sound collecting unit that collects the sound with the predetermined pattern, and the first-terminal control unit 15 performs positioning based on a sound pressure or an arrival time and notifies the second terminal device 20 of the positioning result, it is possible to detect that the first terminal device 10 is in the vehicle. Instead of using such sound, by causing the first-terminal communication unit 14 and the onboard-device communication unit 32 to communicate with each other using very weak radiowaves of which a coverage is the inside of the vehicle and causing the first-terminal control unit 15 to notify the second terminal device 20 when communication is possible, it is possible to detect that the first terminal device 10 is in the vehicle. In addition, detection that the first terminal device 10 is in the vehicle can be performed using various sensors or the like and a method of detecting an occupant is not limited.

When Steps S102 and S103 are not performed and transmission of sound data or emission of sound is not performed, setting of a destination in Step S203 is performed and the processes of Steps S204 to S207 can be suspended until an operation such as reproduction of music is performed by the user.

When the type of sound data is "telephone," the second-terminal control unit 22 may collect communication voice of the user using a hand-free microphone of the vehicle instead of using the voice collecting unit 13 of the first terminal device 10 in Step S204. In this case, the second-terminal control unit 22 requests the onboard device 30 to transmit sound collected by the hands-free microphone, and the onboard-device control unit 33 generates sound data based on the sound collected by the hands-free microphone or the like in response to the request and causes the onboard-device communication unit 32 to transmit the generated sound data to the second terminal device 20.

When the type of sound data is "telephone," the onboard device 30 may detect the positions or the number of occupants in the vehicle through the use of the above-mentioned occupant detecting function using the first terminal device 10 or various sensors in the vehicle, and may transmit sound data to the first terminal device 10 regardless of the result of notification in Step S202 when there is an occupant other than the user in voice communication. Accordingly, only the user in voice communication can privately listen to voice of a communication partner. A destination of sound data of which the type is "telephone" when there is an occupant other than the user may be additionally set in the server 40 and the destination of sound data may be set on the basis of the result of notification in Step S202 and whether there is an occupant other than the user in Step S203. In voice communication in the vehicle, a sound volume which can be emitted from a speaker of the onboard-device sound emitting unit 31 may be reduced or the speaker may be silenced. When there is a plurality of speakers, the sound volume of at least a speaker closest to the user in voice communication may be reduced or the speaker may be silenced. Accordingly, voice from the speaker is not easily mixed into communication voice to facilitate the communication and an occupant other than the user in voice communication can listen to music from the speaker. This process is not limited to a case in which the type of sound data is "telephone." A specific type indicating music or the like which a user wants to privately enjoy but does not want others to listen to may be provided as the type of sound data and the same process may be performed on such a type. When there is no occupant, the same process may be performed. Accordingly, it is possible to prevent a user from having difficulty in listening to sound from the first terminal device 10 due to sound from the speaker.

Figure 5:
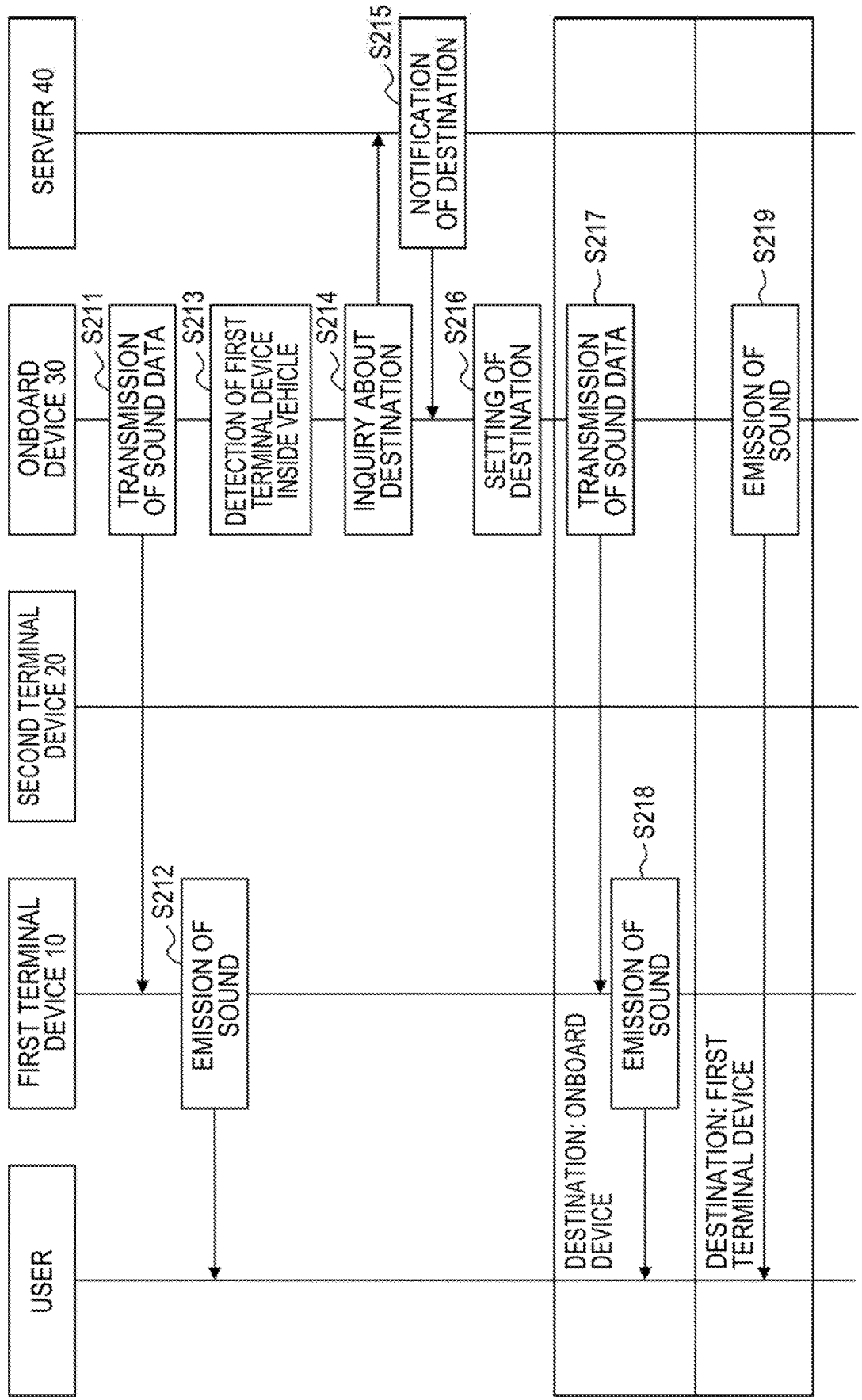
FIG. 5 is a sequence diagram illustrating an additional process flow according to the embodiment of the disclosure.

(Example of additional process of Step S200: Steps S211 to S219) FIG. 5 is a sequence diagram illustrating an example of an additional process in the output destination switching process. In this additional process, the onboard device 30 performs switching of the destination of sound data. This example can be performed in parallel with Steps S201 to S207.

(Step S211): In this example, the onboard device 30 can guide a user who has succeeded in second authentication using voice. Since the user is outside the vehicle at the time point at which the second authentication has succeeded, the onboard-device control unit 33 sets the destination of sound data generated for guidance to the first terminal device 10. When there is generated sound data, the onboard-device control unit 33 causes the onboard-device communication unit 32 to transmit the generated sound data to the first terminal device 10.

(Step S212): The first-terminal control unit 15 causes the first-terminal sound emitting unit 11 to emit sound based on the sound data received by the first-terminal communication unit 14.

(Step S213): When a user who is wearing the first terminal device 10 boards the vehicle, the onboard-device control unit 33 detects that the first terminal device 10 is in the vehicle using the above-mentioned method.

(Step S214): The onboard-device control unit 33 inquires of the server 40 about the destination of sound data by communication of the second-terminal communication unit 21. The sound data generated by the onboard device is, for example, a type of sound data indicating onboard device voice and a destination thereof is determined, for example, for each identifier of a user. The server 40 stores a table shown in Table 2, for example, in the same format as in Table 1. The destination of sound data may be determined regardless of the identifier of a user. The second-terminal control unit 22 specifies information required for referring to the destination of sound data such as the identifier of a user or the type based on a method of prescribing the destination of sound data and inquires of the server 40 about the information.

TABLE 2

| User | Type: onboard device voice |
|---|---|
| A | Onboard device |
| B | First terminal device |
| C | Onboard device |

(Step S215): The server 40 notifies the second onboard device 30 of the corresponding destination in response to the inquiry. The table shown in Table 2 can be set in advance by each user depending on the user's taste.

(Step S216): The onboard-device control unit 33 sets the destination transmitted from the server 40 as the destination of sound data. For example, when the identifier of a user is "A," the destination thereof is switched from the first terminal device 10 to the onboard device 30. When the identifier of a user is "B," the destination thereof is set to the first terminal device 10 and the destination is not switched as a result.

(Step S217): When the destination set in Step S216 is the first terminal device 10. Steps S217 and S218 are performed. When there is generated sound data, the onboard-device control unit 33 causes the onboard-device communication unit 32 to transmit the sound data to the first terminal device 10.

(Step S218): The first terminal device 10 causes the first-terminal sound emitting unit 11 to emit sound based on the sound data received by the first-terminal communication unit 14. In this way, the process flow ends.

(Step S219): When the destination set in Step S216 is the onboard device 30, Step S219 is performed. When there is generated sound data, the onboard-device control unit 33 transmits the sound data to the onboard-device sound emitting unit 31 of the onboard device 30 such that sound based on the sound data is emitted. In this way, the process flow ends.

In the above-mentioned additional process, when second authentication has succeeded, which represents that a user who is wearing the first terminal device 10 approaches the vehicle, the onboard device 30 can transmit voice for urging the user to perform an operation of touching a door handle for unlocking a door, voice indicating that unlocking of the door has been performed in response to the user's operation, or the like to the first terminal device 10 and can suitably guide the user outside the vehicle. When it is detected that the user who is wearing the first terminal device 10 actually boards the vehicle, it is possible to switch the destination to which of the first terminal device 10 and the onboard device 30 guidance voice for engine start or the like is to be emitted from, for example, depending on the user's taste without causing the user to perform the switching operation, which provides high convenience.

The first-terminal control unit 15 may receive a voice command for causing the user to operate the vehicle after the second authentication. In this case, when it is detected that the second authentication has succeeded, the first-terminal control unit 15 switches die destination of sound data based on the voice command collected by the voice collecting unit 13 from the second terminal device 20 to the onboard device 30. In this case, the onboard-device control unit 33 controls operations of the constituent units of the vehicle such as unlocking a door based on the sound data received by the onboard-device communication unit 32. In this case, the onboard-device control unit 33 may generate sound data indicating response voice in response to the voice command as the sound data.

The order of priority of the processing of music or communication and the processing of the voice from the onboard device 30 or the voice command to the onboard device 30 when the state in which the user listens to music or perform conversation communication by communication between the first terminal device 10 and the second terminal device 20 started in Steps S102 and S103 is maintained in Step S211 or S217 is not particularly limited and can be appropriately determined depending on a device configuration or radio communication specifications of the first terminal device 10 or settings from the user. Switching of the destinations of various sound data or emission of sound may be, for example, suspended or cancelled. For example, in reproduction of music or in voice communication, receiving of sound data of guidance voice of the onboard device 30 or emission of sound may be limited, or guidance voice may be emitted in overlap with the music or the communication voice. In voice communication, receiving of a vehicle operation using a voice command may be limited. The processes of Steps S201 to S207 may not be performed but the processes of Steps S211 to S210 may be performed.

An embodiment of the disclosure has been described above. In the embodiment, the first terminal device 10 and the onboard device 30 inquire of the server 40 about a destination of sound data. Accordingly, settings of the destination for each user and for each type of sound data can be together managed by the server 40, which is preferable. However, the disclosure is not limited thereto, and the first terminal device 10, the second terminal device 20, and the onboard device 30 may individually store the destinations. The destination of sound data may not be correlated with each user or each type of sound data, and the rule of correlation is not limited.

The first authentication and the second authentication may be repeatedly performed at predetermined intervals, or may be performed whenever a vehicle operation such as unlocking a door or starting an engine is performed. In the first authentication, when a sensor that detects a wearing state of the first terminal device 10 on a user's ear is provided and the first-terminal control unit 15 detects detachment of the first terminal device 10 from the ear using the sensor, it is preferable that the authentication result be invalidated and authentication be performed again at the time of next wearing. In the second authentication, when the first terminal device 10 departs from the above-mentioned range 500 and communication radio waves with the onboard device 30 are cut off, it is preferable that the authentication result be invalidated and authentication be performed again at the time of next detection of radiowaves. Accordingly, it is possible to increase the number of opportunities of authentication of a user and thus to improve security. When authentication sound is emitted from the first-terminal sound emitting unit 11 and sound based on sound data such as music or communication voice is emitted, the first-terminal control unit 15 may emit sound of an inaudible band as authentication sound and may not stop emission of the sound based on sound data. Accordingly, sound which a user listens to is not stopped or authentication sound does not overlap the sound, and thus a user can appropriately listen to sound based on sound data.

When a user who is wearing the first terminal device 10 alights from the vehicle, the onboard-device control unit 33 can detect the alighting from the result of detection based on the above-mentioned occupant detecting method and set the destination of sound data to the first terminal device 10. When a user who is wearing the first terminal device 10 alights from the vehicle or when the user departs from the above-mentioned range 500, the second-terminal control unit 22 can detect that fact, for example, by receiving the result of detection from the onboard device 30 or detecting cutoff of communication radiowaves from the onboard device 30 and can set the destination of sound data to the first terminal device 10.

The destination of sound data may be set by another terminal device or another onboard device in addition to the second terminal device 20 and the onboard device 30.

ADVANTAGEOUS EFFECTS

According to the aspect of the disclosure, it is possible to provide an acoustic system that can switch the destination to which of the first terminal device and the onboard device sound which the user wants to listen to is to be emitted from depending on predetermined settings when a user who is wearing the first terminal device 10 on the ear boards the vehicle without causing the user to perform the switching operation and improve convenience for the user.

While an embodiment of the disclosure has been described above, the aspect of the disclosure may be understood as an acoustic system, a first terminal device and an onboard device constituting the acoustic system, a sound emission control method which is performed by a control unit of the devices, a sound emission control program, a non-transitory computer-readable recording medium having the sound emission control program stored therein, or a vehicle having an onboard device mounted therein.

What is claimed is:

1. An acoustic system comprising:
a first terminal device configured to be worn on a user's earhole;
an onboard device; and
a second terminal device configured to transmit sound data to a predetermined destination out of the first terminal device and the onboard device,
wherein the first terminal device includes:
a first-terminal sound emitting unit configured to emit authentication sound with a predetermined frequency and a predetermined sound pressure and sound based on the sound data received by the first terminal device to the user's earhole,
an earhole sound collecting unit configured to collect echo sound from the user's earhole in response to the authentication sound, and
a first-terminal control unit configured to perform acoustic authentication between the first terminal device and a user based on the echo sound,
wherein the onboard device includes:
an onboard-device sound emitting unit configured to emit sound based on sound data which is received or generated by the onboard device, and
an onboard-device control unit configured to perform authentication between the onboard device and the user by receiving a result of the acoustic authentication that is performed by the first terminal device, and
wherein the second terminal device includes a second-terminal control unit configured to:
select one of the first terminal device and the onboard device as the destination of the sound data when the onboard-device control unit detects that a predetermined condition including a condition that the user has been authenticated has been satisfied.

2. The acoustic system according to claim 1, wherein the predetermined condition further includes a condition that the first terminal device is in a vehicle.

3. The acoustic system according to claim 1, wherein the destination of the sound data is determined in advance in correlation with at least the user.

4. The acoustic system according to claim 1, wherein the destination of the sound data is determined in advance in correlation with at least a type indicating a classification of the sound data.

5. The acoustic system according to claim 4, wherein the predetermined condition which is used for the second-terminal control unit to select a destination of a predetermined type of sound data out of the sound data further includes a condition that there is no occupant other than the user in a vehicle.

6. The acoustic system according to claim 1, wherein:
the onboard-device sound emitting unit includes a plurality of speakers;
the onboard-device control unit is configured to detect a position of the user in a vehicle; and
the onboard-device control unit is configured to reduce a sound volume which is able to be emitted from at least a speaker closest to the user or to silence the speaker when it is detected that the second terminal device is transmitting a predetermined type of sound data to the first terminal device.

7. The acoustic system according to claim 1, wherein the second-terminal control unit is configured to select the destination of the sound data based on information acquired from a server.

8. The acoustic system according to claim 1, wherein:
the onboard-device control unit is configured to generate sound data; and
the onboard-device control unit is configured to select the first terminal device as a destination of the sound data generated by the onboard-device control unit when the user has been authenticated.

9. The acoustic system according to claim 8, wherein the onboard-device control unit is configured to select one of the first terminal device and the onboard-device sound emitting unit as the destination of the sound data generated by the onboard-device control unit when it is detected that the first terminal device is in a vehicle after the user has been authenticated.

10. The acoustic system according to claim 9, wherein the onboard-device control unit is configured to select the destination of the sound data generated by the onboard-device control unit based on information acquired from a server.

11. The acoustic system according to claim 1, wherein:
the first terminal device further includes a voice collecting unit configured to collect a user's voice;
the first-terminal control unit is configured to generate sound data based on the voice collected by the voice collecting unit; and
the first-terminal control unit is configured to
  select the second terminal device as the destination of the sound data generated by the first-terminal control unit when the onboard-device control unit does not detect that the user has been authenticated, and
  select the onboard device as the destination of the sound data generated by the first-terminal control unit when the onboard-device control unit detects that the user has been authenticated.

12. The acoustic system according to claim 1, wherein the first-terminal control unit is configured to emit sound of an inaudible band as the authentication sound at the same time as emitting sound based on the sound data received by the first terminal device when the first-terminal sound emitting unit is made to emit the authentication sound while the first-terminal sound emitting unit is emitting the sound based on the sound data.

13. An acoustic system comprising:
an electronic earpiece configured to be worn on a user's earhole;
an onboard device; and
a smartphone configured to transmit sound data to a predetermined destination out of the electronic earpiece and the onboard device,
wherein the electronic earpiece includes:
  a speaker configured to emit authentication sound with a predetermined frequency and a predetermined sound pressure and sound based on the sound data received by the electronic earpiece to the user's earhole,
  a microphone configured to collect echo sound from the user's earhole in response to the authentication sound, and
  a controller configured to perform acoustic authentication between the electronic earpiece and a user based on the echo sound,
wherein the onboard device includes:
  an onboard speaker configured to emit sound based on sound data which is received or generated by the onboard device, and
  an onboard controller configured to perform authentication between the onboard device and the user by receiving a result of the acoustic authentication that is performed by the controller of the electronic earpiece, and
wherein the smartphone includes a smartphone controller configured to:
  select one of the electronic earpiece and the onboard device as the destination of the sound data when the onboard controller detects that a predetermined condition including a condition that the user has been authenticated has been satisfied.

14. An acoustic system comprising:
a first terminal device configured to be worn on a user's earhole;
an onboard device; and
a second terminal device configured to transmit sound data to a predetermined destination out of the first terminal device and the onboard device,
wherein the first terminal device includes:
  a first-terminal sound emitting unit configured to emit authentication sound with a predetermined frequency and a predetermined sound pressure and sound based on the sound data received by the first terminal device to the user's earhole,
  an earhole sound collecting unit configured to collect echo sound from the user's earhole in response to the authentication sound, and
  a first-terminal control unit configured to perform acoustic authentication between the first terminal device and a user based on the echo sound,
wherein the onboard device includes:
  an onboard-device sound emitting unit configured to emit sound based on sound data which is received or generated by the onboard device, and
  an onboard-device control unit configured to communicate with the first terminal device, and perform authentication between the onboard device and the user by receiving the echo sound and analyzing the echo sound, and
wherein the second terminal device includes a second-terminal control unit configured to:
  select one of the first terminal device and the onboard device as the destination of the sound data when the onboard-device control unit detects that a predetermined condition including a condition that the user has been authenticated has been satisfied.

* * * * *